(No Model.)
J. T. POPLAWSKY.
TIRE FOR CYCLE WHEELS.
No. 516,833. Patented Mar. 20, 1894.
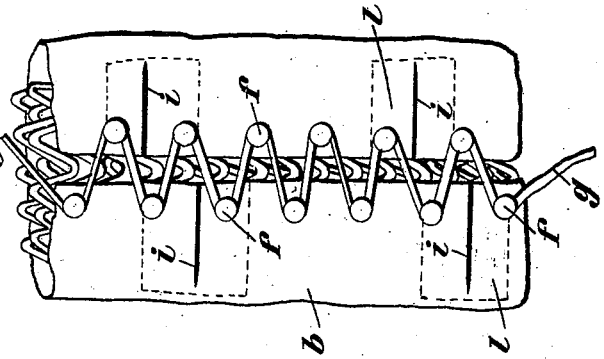
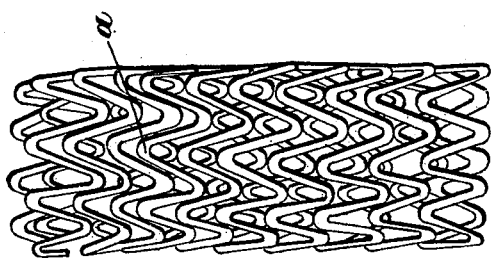
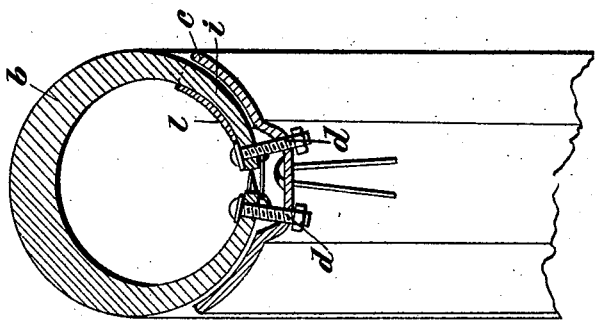
Witnesses
Harvey L. Maddox.
Fred. A. Holden.
Inventor
Josef Theodor Poplawsky
by
Wright, Brown & Quesley
his Attys.
THE NATIONAL LITHOGRAPHING COMPANY,
WASHINGTON, D. C.

United States Patent Office.

JOSEF THEODOR POPLAWSKY, OF BREMERHAVEN, GERMANY.

TIRE FOR CYCLE-WHEELS.

SPECIFICATION forming part of Letters Patent No. 516,833, dated March 20, 1894.

Application filed September 25, 1893. Serial No. 486,439. (No model.)

*To all whom it may concern:*

Be it known that I, JOSEF THEODOR POPLAWSKY, of 39-41 Am Hafen, Bremerhaven, in the Kingdom of Prussia, in the Empire of Germany, have invented a new and useful Improved Tire for the Wheels of Cycles, of which the following is a specification, reference being had therein to the accompanying drawings.

My invention relates to an improved construction of tires for the wheels of cycles which possess the advantages of a pneumatic tire while avoiding the necessity of filling the same with compressed air.

In the accompanying drawings which illustrates my improved tire:—Figure 1 is a view in cross section of the tire. Fig. 2 is a view in elevation of the elastic wire insertion, and Fig. 3 is a view in plan of the tire.

Throughout the views similar parts are marked with like letters of reference.

My improved tire is constructed in the following manner:—A wire insertion "$a$" made in the form of a closed ring as shown by Fig. 2 is inclosed in a rubber cover "$b$" as shown by Fig. 3. The mode of attachment of the rubber cover "$b$" on the wire insertion "$a$" is illustrated by Fig. 3.

The wire insertion "$a$" is preferably made of steel wire which is first bent into an undulating or corrugated shape and it is then wound into a spiral. A spiral of this kind of the requisite length is then connected together in a suitable manner so as to form a closed ring. A ring of this construction has extraordinary elasticity because its tube-like shell or wall can readily expand in the direction of its length, and the several corrugated or undulating portions of the spiral coils are capable of yielding in a radial direction.

I prefer to construct the metallic insertion of a number of parts which are connected together in a suitable manner by sheet metal eyelets, so that if one of the said parts should become damaged in any way, it can be easily replaced, even by inexperienced persons.

The rubber cover "$b$" is not of a closed tubular form, but it is slit or divided circumferentially on its under side. Near the two divided edges of the rubber cover "$b$" are fixed a number of eyelets "$f$" arranged diametrically opposite to each other. Through said eyelets there is passed a lace or wire "$g$" which enables the rubber cover to be tightened uniformly throughout its length. The tire thus constructed is opened out to a suitable extent and is slipped over the wheel rim "$e$," but as a rubber ring completely closed upon itself can only be opened out to the proper extent with great trouble, I form the rubber cover with numerous incisions "$i$" starting from its divided edges, which considerably facilitate the opening out of the rubber cover. In order to effect a tight closure of the incisions "$i$," after the tire has been placed upon the wheel rim, elastic plates "$l$" are placed behind the incisions "$i$" as shown by Figs. 1 and 3. These elastic plates are preferably attached to the inside of the rubber cover "$b$" in such a manner that they cover the said incisions. As an alternative the elastic plates may be placed in the wall or thickness of the rubber cover. The plates "$l$" close—by reason of their elasticity—the incisions "$i$" in the cover after the tire has been mounted on the wheel rim. The incisions are of such a length that they are completely covered by the wheel rim "$c$" when the cover is in place.

To fix the tire to the rim small screws "$d$" are attached to the rubber cover, these screws are passed through the wheel rim "$c$" and are drawn up tight by means of nuts screwed on to the said screws.

I wish it to be particularly understood that I do not limit myself to the precise details of construction hereinbefore described and illustrated by the accompanying drawings, but that I hold myself at liberty to make such changes and alterations as fairly fall within the spirit and scope of my invention.

What I claim, and desire to secure by Letters Patent of the United States, is—

1. A wheel tire comprising in its construction a rubber jacket or outer covering and a metallic insertion inclosed by said jacket or covering and composed of wire wound or coiled in spiral form, each coil being bent to form undulations or corrugations, substantially as described.

2. In a tire for cycle wheels, a ring-shaped metallic insertion of spiral form closed upon itself, the separate convolutions of the said insertion being made corrugated or undulating for the purpose of giving it great strength and considerable elasticity, the said insertion being constructed in one or more lengths suitably connected together, whereby in case of damage to the insertion it can readily be repaired or replaced as set forth.

3. In a wheel tire, the combination with a spirally wound metallic insertion, of a rubber cover therefor having incisions in its edges, and elastic plates covering said incisions, and a lacing for tightening the cover upon the metallic insertion, substantially as described.

In witness whereof I have hereunto set my hand in presence of two witnesses.

JOSEF THEODOR POPLAWSKY.

Witnesses:
ADOLF ALTMANN,
BERTUR BORTLING.